(12) United States Patent
Gemmell

(10) Patent No.: US 7,383,346 B2
(45) Date of Patent: Jun. 3, 2008

(54) PROGRESSIVE STREAMING MEDIA RENDERING

(75) Inventor: David Gemmell, Danville, CA (US)

(73) Assignee: Microsoft Corporation, Redmond, WA (US)

( * ) Notice: Subject to any disclaimer, the term of this patent is extended or adjusted under 35 U.S.C. 154(b) by 156 days.

(21) Appl. No.: 11/188,077

(22) Filed: Jul. 21, 2005

(65) Prior Publication Data

US 2006/0015633 A1 Jan. 19, 2006

Related U.S. Application Data

(62) Division of application No. 09/681,195, filed on Feb. 16, 2001, now Pat. No. 7,237,032.

(51) Int. Cl.
*G06F 15/16* (2006.01)

(52) U.S. Cl. .................. 709/231; 709/203; 709/217; 725/40; 725/87

(58) Field of Classification Search ............. 709/231, 709/203, 217, 227–228, 230; 725/40, 87, 725/94, 90, 98
See application file for complete search history.

(56) References Cited

U.S. PATENT DOCUMENTS

| | | | | |
|---|---|---|---|---|
| 6,460,153 B1 * | 10/2002 | Chou et al. | .................. | 714/746 |
| 6,470,469 B1 * | 10/2002 | Chou et al. | .................. | 714/746 |
| 6,496,980 B1 * | 12/2002 | Tillman et al. | ................ | 725/90 |
| 6,510,553 B1 * | 1/2003 | Hazra | ........................... | 725/87 |
| 6,532,562 B1 * | 3/2003 | Chou et al. | .................. | 714/776 |
| 6,564,262 B1 * | 5/2003 | Chaddha | ...................... | 709/231 |
| 6,594,798 B1 * | 7/2003 | Chou et al. | .................. | 714/820 |
| 6,987,728 B2 * | 1/2006 | Deshpande | .................. | 370/229 |
| 6,996,097 B1 * | 2/2006 | Chou et al. | .................. | 370/389 |
| 7,237,032 B2 * | 6/2007 | Gemmell | .................... | 709/231 |
| 2002/0021761 A1 * | 2/2002 | Zhang et al. | .......... | 375/240.27 |
| 2002/0116473 A1 * | 8/2002 | Gemmell | .................... | 709/219 |
| 2002/0126698 A1 * | 9/2002 | Deshpande | .................. | 370/467 |
| 2006/0015633 A1 * | 1/2006 | Gemmell | .................... | 709/231 |
| 2006/0015634 A1 * | 1/2006 | Gemmell | .................... | 709/231 |

\* cited by examiner

*Primary Examiner*—Lashonda T Jacobs
(74) *Attorney, Agent, or Firm*—Lyon & Harr, LLP; Richard T. Lyon

(57) ABSTRACT

A system and process for providing progressively higher quality versions of an audio and/or video program over a client-server based network. In response to a user command to view a particular program, the client requests layered data associated with the program from the server. The client also specifies how many consecutive layers are to be transmitted based on the bandwidth available on the network. The client then receives the data from the server, caches it, renders it as it is received, and presents it to the viewer. Upon a request from the user for a higher quality version of the program, the client requests as many enhancement layers associated with the program as possible given the available bandwidth. The client receives the requested data, combines it with the previously stored lower-level layer data, renders the higher quality version of the program, and presents the new version to the user.

8 Claims, 5 Drawing Sheets

PROGRESSIVE STREAMING MEDIA RENDERING

CROSS-REFERENCE TO RELATED APPLICATIONS

This application is a divisional of a prior application entitled "PROGRESSIVE STREAMING MEDIA RENDERING" which was assigned Ser. No. 09/681,195 and filed Feb. 16, 2001 now U.S. Pat. No. 7,237,032.

BACKGROUND

1. Technical Field

The invention is related to streaming media rendering, and more particularly to a system and process for obtaining progressively higher quality versions of an audio and/or video program over a client-server based network.

2. Background Art

Audio and video information is commonly sent from a server to a client over a network connection, particularly over the Internet. For example, many news and sports web sites on the Internet contain short video clips which can be accessed by a user. One typical way that this happens is for a user to download the data associated with the desired clip. This is accomplished by a client computer associated with the user making a request for the data from a server upon which the data is resident. The server then transfers the requested data to the client via the network. Once all the data has been received by the client, the client computer renders it and presents it to the user in the normal manner. However, when data is transferred over a network, and particularly over the Internet, the channels between the server and client can vary dramatically in capacity, often by two or three orders of magnitude. These differences in capacity exist because the data transmission rates associated with the connections to a particular client can vary (e.g., phone line capacity, LAN and/or modem speeds). This heterogeneity in capacity can cause problems, particularly if high quality audio and video is desired. For example, downloading a high quality, and therefore large bandwidth, version of an video clip from a website on the Internet could mean waiting for much longer than the duration of the clip itself. Thus, the user has to wait to see the video clip, often with the result of frustrating the user. Furthermore, the user may not know if the video clip is of interest without viewing it, so waiting to download something that may not even be interesting is doubly unattractive.

The downloading issue can be avoided by using a form of audio and video data transfer referred to as a real-time unicast multimedia presentation. Essentially, this scheme involves streaming data associated with a requested video program from the server to the client over the network. As the data is received by the client, it is rendered and presented to the user on a nearly real time basis. However, the aforementioned bandwidth limitations typical of a network, and particularly the Internet, also create problems for this type of transfer. For example, the typical bandwidth available on a network like the Internet is inadequate to allow the streaming of a high quality color video. Thus, a particular client may not have the bandwidth available to receive the highest quality transmission that a server is capable of providing.

To overcome this bandwidth problem, audio and video information can be transmitted via a layered scheme. In a layered scheme, audio and video information is encoded in layers of importance. Each of these layers is transmitted in a separate data stream, which are in essence a sequence of packets. The base layer is an information stream that contains the minimal amount of information, for the least acceptable quality. Subsequent layers enhance the previous layers, but do not repeat the data contained in a lower layer. In order to obtain the higher quality, a client must receive the lower layers in addition to the higher layers that provide the desired quality. Thus, the layers are hierarchical in that there is at least one base layer, and one or more additional higher level enhancement layers. There can in fact be several hierarchical layers building up from a base layer with each subsequent layer being dependent on the data of one or more lower level layers and enhancing those lower level layers. An illustrative (but perhaps not particularly realistic) example of a layered video program would include a base layer that consists of black and white video of every odd numbered video frame, a second layer that consists of black and white video of every even numbered video frame, and a third layer that consists of color information for all frames. Playing only the first layer would get a black and white video at ½ frame rate (i.e. somewhat jerky). Playing the first and second layers together would yield a black and white video at full frame rate (smooth motion). Playing all three layers would yield a color video at full frame rate.

In a layered scheme, a client can request as many layers as desired, provided the total bandwidth of the layers is not greater than the bandwidth available on the network. For example, if the client is connected to the Internet by a 28.8 Kbps modem, then it can feasibly subscribe to one, two, or three 8 Kbps video layers. If it subscribes to more than three such layers, then congestion will certainly result and many packets will be dropped randomly, resulting in poor video quality. By observing packet drops the maximum number of layers that can be supported can be determined.

SUMMARY

The present invention is directed at a system and process of employing a layered unicast scheme that both allows a user to avoid the delay and wasted time associated with downloading an audio-video (AV) program that he or she subsequently determines to be of no interest, and at the same time to obtain higher quality versions of a program in the case it is of interest to the user. It is noted that there are numerous different layering techniques currently in use, and any of them can be used in conjunction with the present invention.

The layered unicast scheme according to the present invention is generally accomplished as follows. In response to a user command to view a particular AV program the client requests the server on which the associated layered AV data resides to transmit the data to the client over the network. In doing so, the client also specifies how many consecutive layers beginning with the base layer are to be transmitted. This decision is based on the bandwidth currently available on the network link between the client and server. Upon receiving the client's request, the server transmits the requested data to the client over the network. The client receives the data from the server, renders it as it is received, and presents it to the viewer via conventional methods. The client also caches the received data for future use.

The rendered data presented to the user will typically be quite rudimentary as typically only the base layer, and perhaps a few of the lower-level enhancement layers will be able to be requested due to the typical bandwidth limitations, such as associated the Internet. The user has three choices at this point in the process. If the AV program is not interesting to the user, the user could do nothing and additional enhancing layer data would not be transmitted. Alternately, the user could direct that the receipt of an incoming data stream be terminated. Or, finally, the user could review the AV program and be interested enough to want to receive a higher quality version of the program. To this end, the user would instruct the client to provide an enhanced version of the program.

In the case where the user requests an enhanced version of the AV program, the client would once again request that the server provide AV data associated with the desired program to be transmitted to it over the network. However, this time the client requests as many of the consecutive enhancement layers as possible given the available bandwidth starting with the lowest level layer that was not requested in the last iteration. In response, the server transmits the requested data in the same manner as described previously. Upon receipt of the requested data, the client combines it with the previously stored lower-level layer data using the standard methods applicable to the type of layering scheme involved. The combined data is then used to render the program and it is presented to the user. The rendered program will represent a higher quality version of the previously viewed program. The client also stores the new data for future use, along with the previously stored data associated with the same program.

At this point, the user has the same three options as discussed above, and the process is repeated as appropriate depending on which of the options the user chooses. For example, if the user wishes to be provided with an even higher quality version of the AV program, more enhancement data layers (assuming there are any available from the server) are requested by the client and processed upon receipt as described above.

It is noted that the foregoing layered unicast system and process can be applied to the entire layer data streams such that a single client request results in the data streams of the requested layer being transmitted in their entirety from the server. However, this need not be the case. The available bandwidth may change significantly over the period of time it takes to transmit the requested layers. In view of this, the foregoing system and process can be applied not to entire layer data streams, but to some portion of the streams representing a segment of the AV program. In other words, instead of the client requesting a set of layers in their entirety, it instead requests just an equal-sized, corresponding, portion of each of the layers involved, based on the currently available bandwidth. The layer portions are corresponding in that they pertain to the same temporal segment of the AV program. The remaining actions described above are the same, except they are performed on the data of the layer portions instead. The result is that the data associated with a portion of each layer stream is received, rendered and cached. The client then requests the next sequential portion the AV program layers, and the process of receiving, rendering and caching is repeated until the entire program is played to the user. It is noted that with the request of each set of layer portions, the number of layers involved is reassessed based on the then available network bandwidth. Thus, each request may result in portions of the same number of layers, or fewer, or more, being requested. If the user directs that an a higher quality version of the AV program be played, the client repeats the foregoing process except that the client requests, for each segment of the program, those layer portions associated with the maximum number of enhancement layers possible given the current bandwidth conditions on the network starting with the layer that represents the next-higher level in regards to the previously received layer portions associated with the segment of the program under consideration.

The foregoing layered unicast presentation system and process can further include a pre-fetching option. This option allows a user to select whether additional enhancement layers needed to provide higher quality versions of the program are to be requested, received and cached automatically by the client after the layers associated with a previous lower-quality version of the program have all been requested. Note that this is done in advance of the user requesting a higher quality version. The pre-fetching option results in the layer data needed to render a higher quality version of the AV program being on-hand in the client's memory, thereby allowing the client to provide the program to the user more quickly.

It is noted that while the present layered unicast scheme was described above in connection with an AV program, the invention is equally applicable to audio-only or video-only programs.

It is further noted that the layered unicast system and process according to the present invention can be advantageously employed by Internet web sites to sell high quality versions of the AV programs to subscribers visiting the web site. A "base quality" version of a program could be offered to a site visitor for free or for a nominal fee. If the base version of the AV program is of sufficient interest, the visitor could subscribe for a fee to view an improved quality version of the program. This is accomplished as described above with the enhancement layers being sent to the client computer associated with the visitor. The client computer then combines the enhancement layer data with the previously cached layer data to produce a higher quality version of the program for the visitor to view. The visitor could then repeat the request to view even high quality versions of the program as long as the sever associated with the web site has higher level enhancement layers available.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
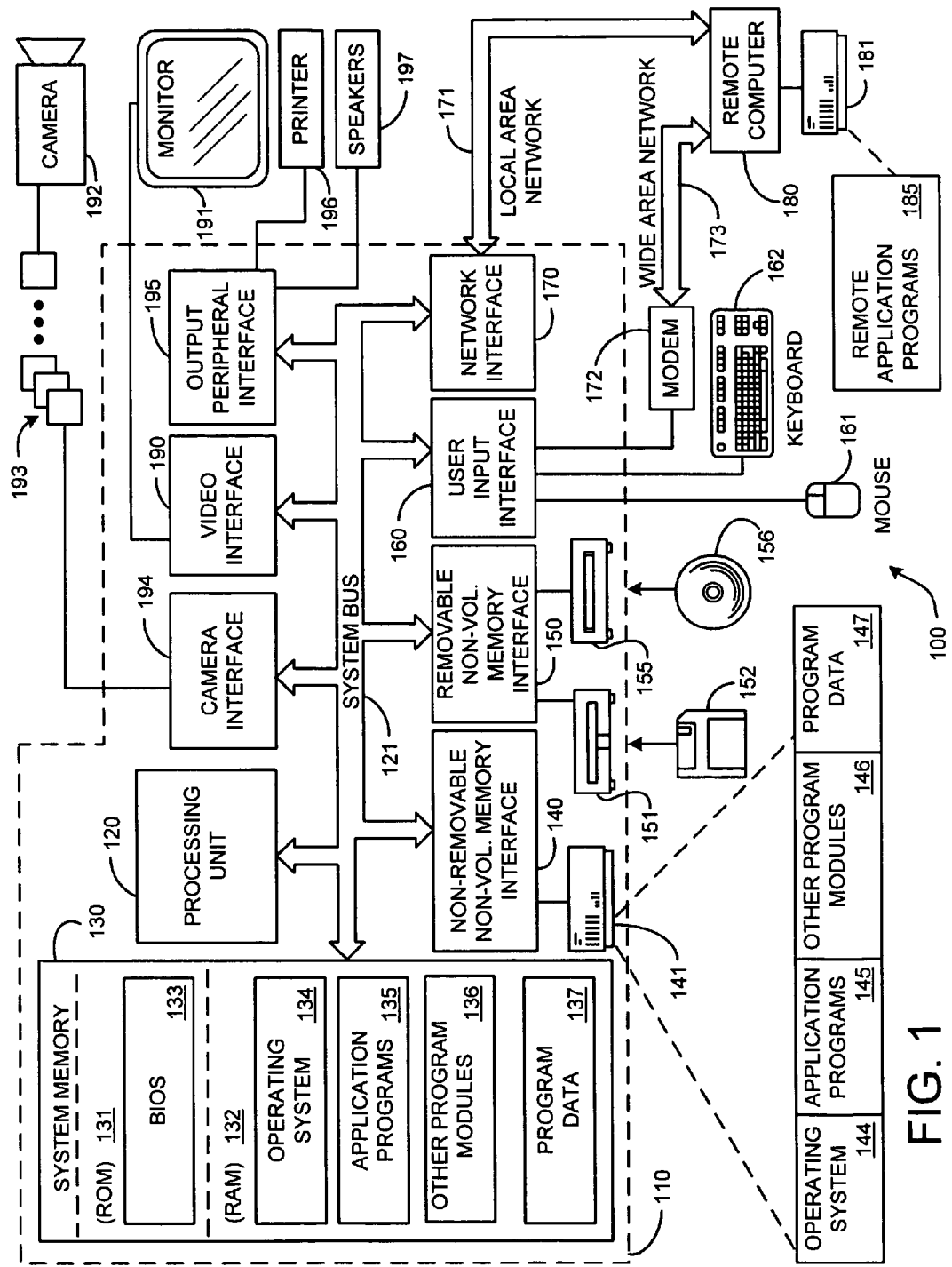
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2A:
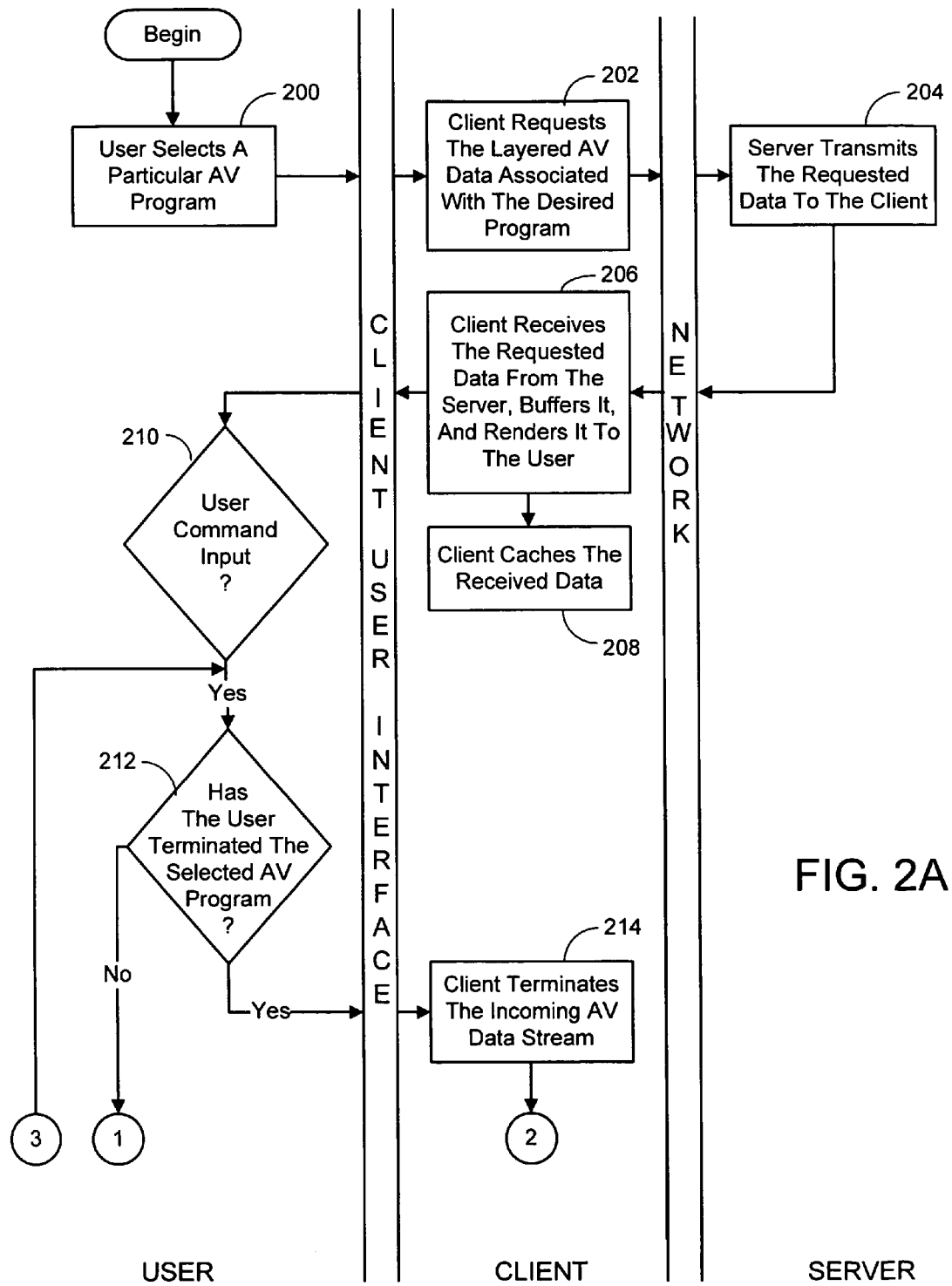
FIGS. 2A-B present a flow chart diagramming an overall process for obtaining progressively higher quality versions of an audio and/or video program over a client-server based network in accordance with the present invention.
Figure 2B:
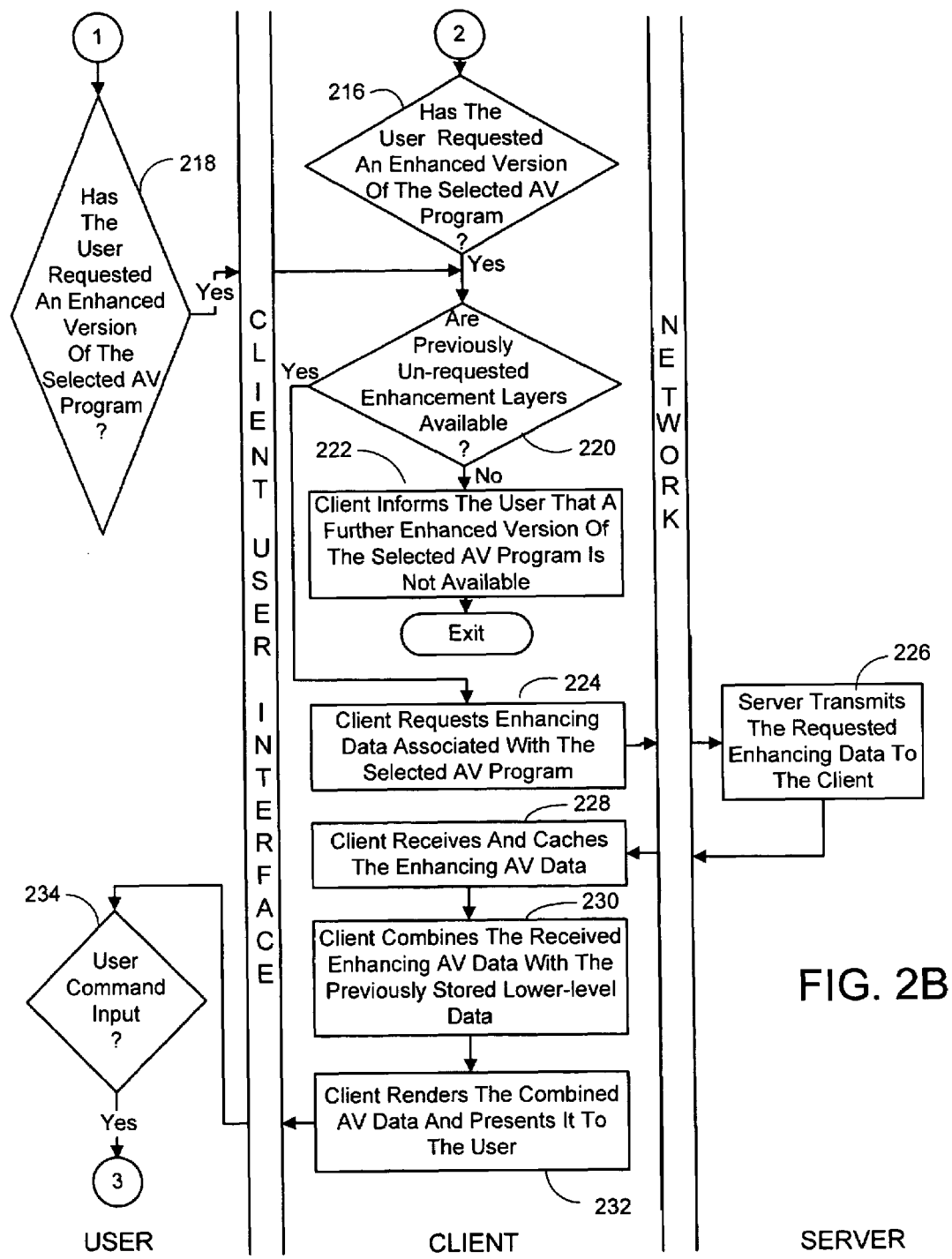

The exemplary operating environment having now been discussed, the remaining part of this description section will be devoted to a description of the program modules embodying the invention. Generally, the system and process according to the present invention involves a client obtaining progressively higher quality versions of an audio and/or video program over a client-server based network. This is accomplished using what will be termed a layered unicast scheme. Specifically, referring to the flow diagram of FIGS. 2A-B, a user first directs the client to obtain a particular AV program (process action 200). This is accomplished via any conventional client-user interface. In the case where the network is the Internet, a user will typically select a particular program from a web site that provides such programs. The client then requests that the server on which the layered AV data associated with the desired program resides, transmits the data to the client over the network (process action 202). In doing so, the client also specifies how many consecutive layers beginning with the base layer are to be transmitted. This decision is based on the bandwidth currently available on the network link between the client and server. Of course, in order to specify the appropriate number of consecutive layer, the client must know the specifics of the layering scheme employed to segment the AV data, and how to identify the desired layers when requesting them from the server. The client might already know this information in a case of a network where a standardized layering and identification scheme is employed. However, for networks such as the present day Internet where many different layering and identification schemes could be employed, it is envisioned that the process action of the client requesting the AV data associated with the selected program will include first obtaining from the server specifics as to the layering and identification scheme employed in conjunction with the program.

Upon receiving the client's request, the server transmits the requested data to the client over the network (process action 204). The transmission rate should at least equal the playback rate so that there is no delay in rendering the data for real-time presentation to the user by the client. The client receives the data from the server, preferably feeds it through a "playout buffer", and renders it to the viewer via conventional methods (process action 206). The playout buffer delays the beginning of the playback by some small amount of time to accumulate extra data. This buffering allows the client to ensure the playback rate is constant. Without such buffering the rendered program can be "jittery" due to small variations in the rate at which the data is received over the network. The client also caches the received data for future use as will be explained shortly (process action 208).

At this point in the process, the user has three choices. If the AV program is not interesting to the user, the user could do nothing and additional enhancing layer data would not be transmitted. To this end, in process action 210, it is determined whether the user inputs any further commands concerning the previously selected AV program. If an input is received from the user, it is ascertained whether the user has directed that the receipt of the incoming data stream associated with the selected AV program be terminated (process action 212). In other words, has the user cut the AV program short. If so, the client terminates the incoming data stream (process action 214). It is noted that the user's act of cutting the program short may not end the process as this does not necessarily mean the user is not interested in viewing enhanced versions of the program. For example, the user may view just enough of the lower quality base version of the program to decide he or she wants to see an enhanced version right away rather than continuing to view the lower quality version. Thus, it is next determined if the user requests the enhanced version of the selected AV program (process action 216).

The third of the aforementioned scenarios involves the user reviewing the entire AV program and becoming interested enough to want to receive a higher quality version of the program. In this case, it would be determined in process action 212 that the user did not direct the receipt of the incoming data stream to be terminated, but rather requested an enhanced version of the program (process action 218).

In the case where the user does not request an enhanced version of the AV program, no action is taken and the client would keep the cached data for the amount of time dictated by the caching rules of the network software employed by the client. If, however, the user directs that an enhanced version of the AV program be provided (regardless of whether the full program was previously viewed or it was cut-off mid-stream), the client would request that enhancing AV data associated with the desired program be provided to it over the network. However, this assumes that the server has additional enhancement layers available. Thus, prior to requesting the enhancing data, it is first determined in process action 220 whether their are any previously unrequested enhancement layers associated with the selected AV program available from the server. Preferably, the client will already know this based on the previously received information as to the layering and identification scheme employed in conjunction with the selected AV program. If additional layers are not available, the user is informed of this by the client (process action 222) and the process ends. If additional layers are available, then the client requests that the server provide the enhancing AV data associated with the desired program (process action 224). Specifically, the client requests as many of the consecutive enhancement layers as possible given the available bandwidth starting with the lowest level layer that was not requested in the last iteration. In response, the server transmits the requested data in the same manner as described previously (process action 226).

As the requested data is received, the client stores the new data (process action 228), and combines it with the previously stored lower-level layer data using the standard methods applicable to the type of layer data involved (process action 230). The combined data is then used to render the program and it is presented to the user (process action 232). The rendered program will represent a higher quality version of the previously viewed program.

At this point, if the user decides that the AV program is no longer of interest, he or she can again do nothing and additional enhancing layer data would not be transmitted, or the user could request an even more enhanced version of the selected program, or the user could terminate the incoming data stream before the full program is viewed. Thus, the user has the same three options as before. To this end, in process action 234, it is determined whether the user inputs any further commands concerning the previously selected AV program. If a user command is input, then the foregoing process (of actions 212 through 234) is repeated. In this way, the process of obtaining higher and higher quality versions of the selected AV program can continue until either the user fails to request an enhanced version, or there are no remaining enhancement layers available from the server.

A simple example of the foregoing process where only one layer can be streamed at a time due to bandwidth limitations is as follows. During the first playback, the base layer is streamed, played, and stored. During a user-directed second playback, layer 2 is streamed, stored, and played in conjunction with the base layer. During a user-directed third playback, layer 3 is streamed and stored, and played in conjunction with the base layer and layer 2. This can continue for as long as there are remaining enhancement layers available from the server and the user is interested in viewing higher quality versions of the AV program. The process is similar if more than one layer can be streamed at one time. For example, in a case where two layers can be streamed at a time within the bandwidth limitations, the process would be as follows. During the first playback, layer 1 (i.e., the base layer) and layer 2 are streamed, played, and stored. During a user-directed second playback, layers 3 and 4 are streamed, stored, and played in conjunction with layers 1 and 2. And during a user-directed third playback, layers 5 and 6 are streamed and stored, and played in conjunction with layers 1, 2, 3, and 4. Again this process can continue for as long as there are remaining enhancement layers available from the server, and the user is interested in viewing enhanced versions of the program.

It is noted that while the present layered unicast system and process was described above in connection with an AV program, the invention is equally applicable to audio-only or video-only programs.

The foregoing layered unicast system and process can be applied to the entire layer data streams such that a single client request results in the data streams of the requested layer being transmitted in their entirety from the server. However, this need not be the case. The available bandwidth may change significantly over the period of time it takes to transmit the requested layers. In view of this, the present layered unicast system and process can be applied not to entire layer data streams, but to some portion of the streams representing a temporal segment of the AV program. In other words, instead of the client requesting a set of layers in their entirety, it instead requests just an equal-sized, corresponding, portion of each of the layers involved, based on the currently available bandwidth. The layer portions are corresponding in that they pertain to the same temporal segment of the AV program. The process described above in reference to FIG. 2, would apply to this piecewise embodiment as well, with process action 202 involving the client requesting layered AV data associated with the selected program in a piecewise manner. Specifically, a first set of corresponding portions of a number of consecutive layers of the program that it is determined by the client can be received in view of the currently available bandwidth of the network is requested. The client then requests the next sequential portion the AV program layers, and so on until it is determined the entire program has been played to the user or the user cuts the program short. It is noted that with the request of each set of layer portions, the number of layers involved is reassessed based on the then available network bandwidth. Thus, each request may result in portions of the same number of layers, or fewer, or more, being requested. There are several advantages of the piecewise embodiment of the present system and process. For example, the bandwidth available on the network may change enough during the transfer of the AV program that either additional data associated with a higher level enhancement layer could be added thereby improving the quality of the presentation to the user, or conversely the bandwidth could decrease to the extent that the data associated with a layer must be dropped to prevent excessive loss of the transmitted data. The net result is that the rendered AV program provided to the user by the client is the best available over each time period associated with the portion of the data sent. Of course, this piecewise embodiment is more client processor intensive in that the client must keep track of the number of layers involved in each of the requests for a portion of the layer data so that if a higher quality version of the program is requested by the user, the client will know which of the higher level layers to start with when requesting enhancement data for a particular portion of the AV program. In addition, the client must repeatedly request layer data rather than having to do so just once per program.

In the piecewise embodiment, if the user directs that a higher quality version of the AV program be played, process action 220 of FIG. 2 involves the client requesting for each segment of the program, those layer portions associated with the maximum number of enhancement layers possible given the current bandwidth conditions on the network starting with the layer that represents the next-higher level in regards to the previously received layer portions associated with the same temporal segment of the program.

It is noted that the size of the portion of the data in each layer involved in the repeated requests associated with the piecewise embodiment can be any desired. However, it is preferred that the size is selected so that the duration of the portion is approximately the amount of time that it is expected the network bandwidth will remain constant. This sizing can be taken to the extreme if necessary such that each portion is only a single packet of the data stream of each of the layers involved in a request.

Figure 3A:
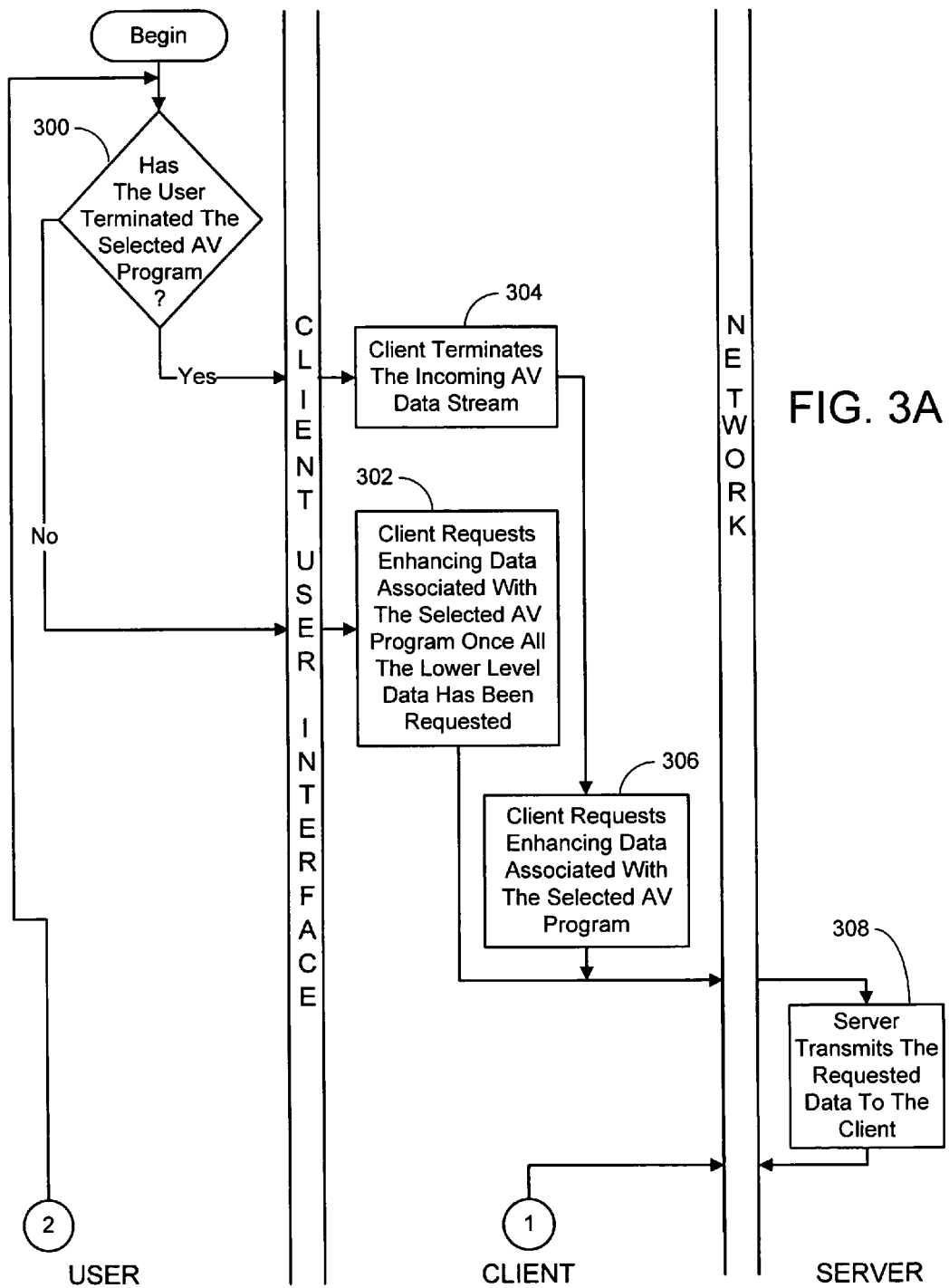
FIGS. 3A-B present a flow chart diagramming a portion of the overall process of FIG. 2 that has been modified to implement a pre-fetching option according to the present invention.
Figure 3B:
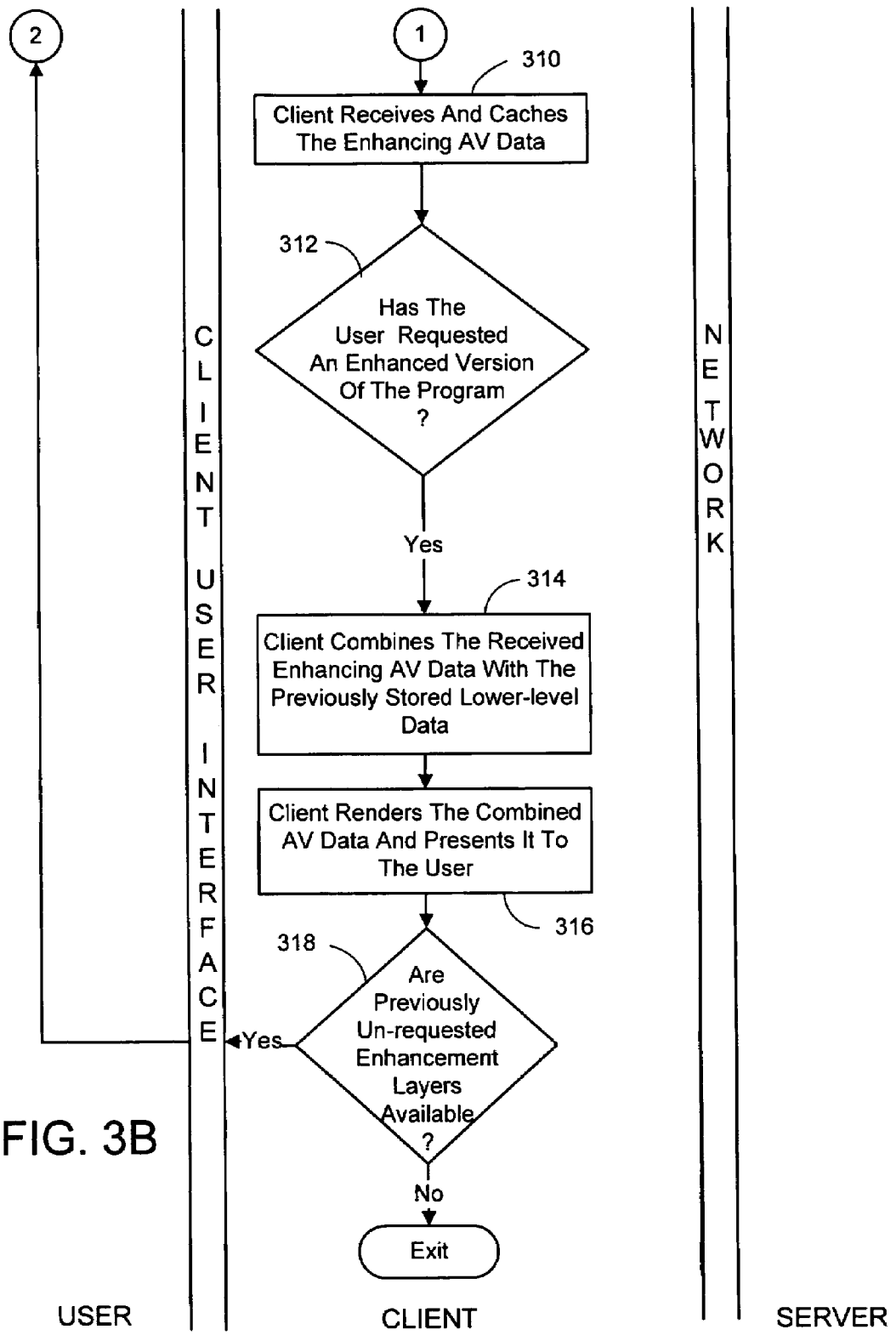

The foregoing layered unicast presentation system and process can further include a pre-fetching option. This option allows a user to select whether additional enhancement layers needed to provide higher quality versions of the program are to be requested, received and cached automatically by the client after the layers associated with a previous lower-quality version of the program have been completely received. Note that this is done in advance of the user requesting a higher quality version. If the user requests that the client automatically obtain the AV data necessary to produce higher quality version of a selected program, the process is essentially the same as outlined in FIG. 2 up to the point where the first layer or layers of the selected program have been received, rendered and cached (i.e., up to process action 208). Thereafter, the process changes as outlined in FIG. 3. Specifically, during the time that the client is receiving, rendering and caching the requested AV data, it is determined whether the user has directed that the receipt of the incoming data stream be terminated (process action 300). If not, the client requests the AV data needed to produce enhanced versions of the selected program once all the data to produce the lower quality version that is being viewed by the user has been requested (process action 302). No direction to do so is required from the user. The enhancing data would be requested as described previously, with as many layers as possible given the available network bandwidth being requested starting with the layer one level up from the highest level layer of the previously requested data. The client could stop once all the enhancing layers associated with the entire program are requested for the latest iteration. However, preferably, the client requests a set of even higher level enhancement layers, and so on until all the available layer data has been requested. If, however, the user cuts the program short, the client terminates the incoming data stream (process action 304). As indicated previously, it is not known at this point whether the user's act of cutting the program short meant he or she is not interested in viewing enhanced versions of the program, or whether wants to see an enhanced version right away rather than continuing to view the lower quality version. Thus, in the case where the user cuts the incoming program short, the client then begins requesting the AV data needed as described above to produce the enhanced version of the selected program (process action 306). Of course, since the previous version of the program was cut short, only the enhancing data associated with the previously received portion of the program can be obtained in the first iteration of the requesting procedure. The more rudimentary layers are requested for the remaining portion of the program. As before, the server would transmit the requested data (process action 308) and the client would receive and cache the incoming data (process action 310). It is then determined if the user requests that a higher quality version of the selected program be provided (process action 312). If such a request is made, the client combines all the layers of AV data it has cached to produce the enhanced version of the selected program (process action 314). In the case of where the layers are requested in a piecewise manner, this last action involves combining all the corresponding layer portions of each consecutive segment of the AV program. The combined data is used to render the program and it is presented to the user (process action 316). It should be noted that the enhanced program in the case of the pre-fetching option may be of a higher quality than produced in the case of the process outlined in FIG. 2 because more than one iteration of enhancement layer requests could have been made, and the data received and cached, prior to the user requesting the enhanced version of the program.

When the user elects to view an enhanced version of a selected AV program, the client may not have completed the task of requesting all the layers available for the program. Thus, it is next determined in process action 318 if there is any remaining layers available from the server. If, so process actions 300 through 318 are repeated. If, however, all the available data has been requested, the process ends.

The pre-fetching option has some attractive advantages. First, pre-fetching results in the layer data needed to render a higher quality version of the AV program being on-hand in the client's memory, thereby allowing the client to provide the program to the user more quickly. Additionally, as indicated above, the client can in essence continually request and cache layer data associated with the selected program. Thus, it is possible to have more than one iteration of enhancement layer data ready for rendering when the user requests an enhance version of the selected program. As a result, a higher quality version of the program can be provided, than can be by requesting and rendering the program one set of enhancement layers at a time.

A variation of the pre-fetching option that is also advantageous involves continuing to request (as needed), receive and cache AV layer data even when the user has instructed that the presentation of the associated program be terminated, rather than terminating the incoming AV data stream. In this way, if the user subsequently directs that a higher quality version of the AV program be provided, the previously-described issue of having only a part of the layer data associated with the terminated version of the program is avoided. This is advantageous as the higher quality version of the program presented to the user would have a generally consistent quality throughout. Without the foregoing procedure, the latter part of the higher quality program would have a noticeable drop in quality level, as the client would have to request the lower level layers associated with the terminated version of the program rather than additional enhancing layers.

Many web sites on the Internet offer AV programs that can be streamed to a client computer, such as the news and sports web sites mentioned earlier. The layered unicast system and process according to the present invention can be advantageously employed by such sites to sell high quality versions of the AV programs to subscribers visiting the web site. In particular, a "base quality" version of a program could be offered to a site visitor for free, or for a nominal fee. This base quality version of the program can be the version that is initially requested and rendered by a client computer associated with the site visitor, which includes the base layer associated with the program and as many enhancement layers as the available bandwidth will allow. However, the base quality version of the AV program can be limited to the base layer and perhaps a small number of enhancement layers as dictated by the server associated with the web site, even if the client initially requests more layers. The purpose of restricting the number of layers provided initially to a site visitor is to let the visitor view a version of the AV program that is just good enough to spark curiosity and entice the visitor to purchase improved version. If the base version of the AV program is of sufficient interest, the visitor could subscribe for a fee to view an improved quality version of the program. This is accomplished as described above with the enhancement layers being sent to the client computer associated with the visitor. The client computer then combines the enhancement layer data with the previously cached layer data to produce a higher quality version of the program for the visitor to view. The visitor could then repeat the request to view even high quality versions of the program as long as the sever associated with the web site has higher level enhancement layers available.

As an example of the forgoing process, assume a user visits a sports web site on the Internet that provides hockey video highlights. The visitor can "click on" one of the highlights listed on the site and watch it at the "base" quality level for free. At this quality level, the visitor might be able to generally see what is happening, but may not see enough detail to even make out the puck. If the highlight is not interesting to the visitor, no further requests would be made, or the visitor might even halt the playback before it is complete. However, if the highlight is of interest, the visitor is invited to subscribe to higher quality versions for a fee. The payment provisions can be handled via any conventional scheme, such as those currently in use on commercial Internet web sites. This time, the visitor sees improved detail, including the puck. Playing it a third time may introduce more video frames, making the playback smoother.

As another example, many web sites contain audio samples or songs. These sites can offer access to a lower-quality version of the audio program for free. Then, if the visitor is interested in higher quality versions of the program, the transfer of additional quality enhancing audio data layers would require the payment of a fee.

In regard to payment for higher quality versions of a program, a single fee can be charged to the visitor for as many "improvement" requests the visitor wishes to make, or alternately, the visitor can be charged for each request.

Wherefore, what is claimed is:

1. A computer-implemented process for providing progressively higher quality versions of an audio-only program, video-only program, or audio and video program over a client-server based network, comprising a server computer performing the process actions of:
providing a base quality version of the program to the client over the network, wherein the base quality version of the program comprises layer data of a layered unicast having hierarchically related layers in that the lowest level layer is a base layer and each subsequently higher level layer adds enhancing information for enhancing the quality of the program that can be rendered from the layers preceding it in the hierarchy, and wherein requesting a base quality version of the program from a server over the network comprises requesting as many layers, in the order of their position in the hierarchy starting with the base layer, as can be transmitted from the server to the client without exceeding the available bandwidth of the network; and
providing at least one enhancement layer of the layered unicast to the client over the network without also providing any layer of the base quality version of the program.

2. The process of claim 1, wherein the process action of providing a base quality version of the program comprises the action of providing the data making up each layer of the base quality version in sequential, equal-sized, temporally corresponding portions such that the layer portions associated with a time segment at the beginning of the program are provided first, and then the layer portions associated with the next sequential time segment of the program are provided, and so on.

3. The process of claim 1, wherein the process action of providing at least one enhancement layer of the program comprises the action of providing the data making up each enhancement layer in sequential, equal-sized, temporally corresponding portions such that the layer portions associated with time segment at the beginning of the program are provided first, and then the layer portions associated with the next sequential time segment of the program are provided, and so on.

4. The computer-implemented process of claim 1, wherein providing at least one enhancement layer of the layered unicast to the client over the network comprises providing as many enhancement layers, in the order of their position in the hierarchy starting with the at least one enhancement layer, as can be transmitted from the server to the client without exceeding the available bandwidth of the network.

5. A client-server based computer network for providing progressively higher quality versions of an audio-only program, video-only program, or audio and video program, comprising:
a server comprising at least one general purpose computing device; and
a computer program comprising program modules executable by the server, wherein the server is directed by the program modules to,
upon a first request from a client computer over the network to provide the program, provide a base quality version of the program to the client over the network, wherein the base quality version of the program comprises layer data of a layered unicast having hierarchically related layers in that the lowest level layer is a base layer and each subsequently higher level layer adds enhancing information for enhancing the quality of the program that can be rendered from the layers preceding it in the hierarchy, and wherein providing a base quality version of the program to the client computer over the network comprises providing as many layers, in the order of their position in the hierarchy starting with the base layer, as can be transmitted from the server to the client without exceeding the available bandwidth of the network, and
upon a subsequent request from a client computer over the network to provide a higher quality version of the program, providing at least one enhancement layer of the layered unicast to the client over the network without also providing any layer of the base quality version of the program.

6. The client-server based computer network of claim 5, wherein providing at least one enhancement layer of the layered unicast to the client over the network comprises providing as many enhancement layers, in the order of their position in the hierarchy starting with the at least one enhancement layer, as can be transmitted from the server to the client without exceeding the available bandwidth of the network.

7. A computer-readable storage medium having computer-executable instructions for providing progressively higher quality versions of an audio-only program, video-only program, or audio and video program over a client-server based network, said computer-executable instructions comprising:

providing a base quality version of the program to a client computer over the network, wherein the base quality version of the program comprises layer data of a layered unicast having hierarchically related layers in that the lowest level layer is a base layer and each subsequently higher level layer adds enhancing information for enhancing the quality of the program that can be rendered from the layers preceding it in the hierarchy, and wherein requesting a base quality version of the program from a server over the network comprises requesting as many layers in the order of their position in the hierarchy starting with the base layer, as can be transmitted from the server to the client without exceeding the available bandwidth of the network; and providing at least one enhancement layer of the layered unicast to the client over the network without also providing any layer of the base quality version of the program.

8. The computer-readable medium of claim 7, wherein providing at least one enhancement layer of the layered unicast to the client over the network comprises providing as many enhancement layers, in the order of their position in the hierarchy starting with the at least one enhancement layer, as can be transmitted from the server to the client without exceeding the available bandwidth of the network.

* * * * *